(12) United States Patent
Audi et al.

(10) Patent No.: US 10,788,091 B2
(45) Date of Patent: Sep. 29, 2020

(54) MASS-OPTIMIZED FORCE ATTENUATION SYSTEM AND METHOD

(71) Applicant: OAKWOOD ENERGY MANAGEMENT, INC., Dearborn, MI (US)

(72) Inventors: Richard F. Audi, Dearborn, MI (US); Donald S. Smith, Commerce, MI (US); Nicholas John Podges, Dearborn, MI (US); Joel M. Cormier, Lathrup Village, MI (US); Dane Robert Winbigler, Grosse Pointe Woods, MI (US)

(73) Assignee: OAKWOOD ENERGY MANAGEMENT, INC., Dearborn, MI (US)

( * ) Notice: Subject to any disclaimer, the term of this patent is extended or adjusted under 35 U.S.C. 154(b) by 432 days.

(21) Appl. No.: 15/682,956

(22) Filed: Aug. 22, 2017

(65) Prior Publication Data

US 2019/0063538 A1    Feb. 28, 2019

(51) Int. Cl.
*F16F 7/12* (2006.01)
*B60R 21/04* (2006.01)
(Continued)

(52) U.S. Cl.
CPC ............ *F16F 7/12* (2013.01); *B60R 21/04* (2013.01); *F16F 1/025* (2013.01); *B29C 51/08* (2013.01);
(Continued)

(58) Field of Classification Search
CPC .. F16F 7/12; F16F 1/025; B60R 21/04; B60R 21/0428; B60R 21/045; B60R 2021/0435;
(Continued)

(56) References Cited

U.S. PATENT DOCUMENTS

| | | |
|---|---|---|
| 1,784,511 A | 12/1930 | Carns |
| 1,958,050 A | 5/1934 | Koppelman |

(Continued)

FOREIGN PATENT DOCUMENTS

WO    WO-2017023870 A1 *  2/2017  ............... A43B 7/34

OTHER PUBLICATIONS

International Search Report and Written Opinion, PCT International Application No. PCT/US2018/044728; dated Oct. 23, 2018.

*Primary Examiner* — Forrest M Phillips
(74) *Attorney, Agent, or Firm* — Brooks Kushman P.C.

(57) ABSTRACT

A force-attenuating system that is interposed between an exterior surface and an interior surface, either or both of which may be subjected to percussive forces. The system has a ceiling that is positioned proximate the exterior surface and one or more inverted hat-shaped force-attenuating units with sidewalls extending inwardly convergingly away from the ceiling. Some of the units have a floor that is positioned proximate the interior surface. Optionally the force-attenuating units may be configured as clover-leaf structures with a central region and hemi-pear-shaped lobes extending therefrom. Within the lobes is a floor that is positioned proximate the interior surface. The force-attenuating system may be deployed in an automotive or non-automotive environment.

32 Claims, 4 Drawing Sheets

(51) Int. Cl.

| | | |
|---|---|---|
| *F16F 1/02* | (2006.01) | |
| *B29C 51/26* | (2006.01) | |
| *B60R 21/045* | (2006.01) | |
| *B62D 25/02* | (2006.01) | |
| *B62D 25/20* | (2006.01) | |
| *B29C 51/08* | (2006.01) | |
| *B29K 105/00* | (2006.01) | |
| *B29C 51/10* | (2006.01) | |
| *B29L 31/30* | (2006.01) | |
| *B29L 31/00* | (2006.01) | |

(52) U.S. Cl.
CPC .......... *B29C 51/10* (2013.01); *B29C 51/268* (2013.01); *B29C 2791/006* (2013.01); *B29K 2105/256* (2013.01); *B29L 2031/3002* (2013.01); *B29L 2031/3044* (2013.01); *B29L 2031/7138* (2013.01); *B60R 21/045* (2013.01); *B60R 21/0428* (2013.01); *B60R 2021/0435* (2013.01); *B60R 2021/0442* (2013.01); *B62D 25/02* (2013.01); *B62D 25/20* (2013.01); *F16F 2226/04* (2013.01)

(58) Field of Classification Search
CPC . B60R 2021/0442; B29C 51/08; B29C 51/10; B29C 51/268; B29C 2791/006; B29K 2105/256; B29L 2031/3002; B29L 2031/3044; B29L 2031/7138; B62D 25/20; B62D 25/02
USPC .......................................... 191/295
See application file for complete search history.

(56) References Cited

U.S. PATENT DOCUMENTS

| | | | |
|---|---|---|---|
| 1,975,002 A * | 9/1934 | Heerwagen | ........... E04B 1/8409 |
| | | | 52/144 |
| 2,090,881 A | 8/1937 | Wilson | |
| 2,225,067 A | 12/1940 | Marin | |
| 2,275,575 A | 3/1942 | Vrooman | |
| 2,349,907 A | 5/1944 | Kos et al. | |
| 2,391,997 A | 1/1946 | Noble | |
| 2,434,641 A | 1/1948 | Burns | |
| 2,924,419 A | 2/1960 | Wells | |
| 3,011,602 A | 12/1961 | Ensrud et al. | |
| 3,018,015 A | 1/1962 | Agriss et al. | |
| 3,071,216 A | 1/1963 | Jones et al. | |
| 3,196,763 A | 7/1965 | Rushton | |
| 3,204,667 A | 9/1965 | Zahorski | |
| 3,231,454 A | 1/1966 | Williams | |
| 3,525,663 A | 8/1970 | Hale | |
| 3,605,145 A | 9/1971 | Graebe | |
| 3,828,715 A | 8/1974 | Matsushita | |
| 3,871,636 A | 3/1975 | Boyle | |
| 3,876,492 A | 4/1975 | Schott | |
| 3,933,387 A | 1/1976 | Salloum et al. | |
| 3,938,963 A | 2/1976 | Hale | |
| 3,980,221 A | 9/1976 | Okada | |
| 3,997,207 A | 12/1976 | Norlin | |
| 4,029,350 A | 6/1977 | Goupy | |
| 4,190,276 A | 2/1980 | Hirano et al. | |
| 4,321,989 A | 3/1982 | Meinzer | |
| 4,352,484 A | 10/1982 | Gertz et al. | |
| 4,413,856 A | 11/1983 | McMahan et al. | |
| 4,635,981 A | 1/1987 | Friton | |
| 4,666,130 A | 5/1987 | Denman et al. | |
| 4,696,401 A | 9/1987 | Wallace | |
| 4,720,261 A | 1/1988 | Fishwick et al. | |
| 4,739,762 A | 4/1988 | Palmaz | |
| 4,755,416 A | 7/1988 | Schneider et al. | |
| 4,757,665 A | 7/1988 | Hardigg | |
| 4,844,213 A | 7/1989 | Travis | |
| 4,909,661 A | 3/1990 | Ivey | |
| 4,980,877 A | 12/1990 | Sugiyama et al. | |
| 5,033,593 A | 7/1991 | Kazuhito | |
| 5,054,753 A | 10/1991 | Polus | |
| 5,141,279 A | 8/1992 | Weller | |
| 5,165,990 A | 11/1992 | Nakano | |
| 5,192,157 A | 3/1993 | Laturner | |
| 5,306,066 A | 4/1994 | Saathoff | |
| 5,364,682 A | 11/1994 | Tanaka et al. | |
| 5,383,314 A | 1/1995 | Rothberg | |
| 5,390,467 A | 2/1995 | Shuert | |
| 5,391,251 A | 2/1995 | Shuert | |
| 5,399,406 A | 3/1995 | Matsuo et al. | |
| 5,401,347 A | 3/1995 | Shuert | |
| 5,435,619 A | 7/1995 | Nakae et al. | |
| 5,444,959 A | 8/1995 | Tesch | |
| 5,500,037 A | 3/1996 | Alhamad | |
| 5,518,802 A | 5/1996 | Colvin et al. | |
| 5,573,272 A | 11/1996 | Teshima | |
| 5,619,832 A | 4/1997 | Myrvold | |
| 5,636,866 A | 6/1997 | Suzuki et al. | |
| 5,660,426 A | 8/1997 | Sugimori et al. | |
| 5,700,545 A | 12/1997 | Audi et al. | |
| 5,727,826 A | 3/1998 | Frank et al. | |
| 5,744,763 A | 4/1998 | Iwasa et al. | |
| 5,762,392 A | 6/1998 | Suga | |
| 5,972,477 A | 10/1999 | Kim et al. | |
| 6,017,084 A | 1/2000 | Carroll, III et al. | |
| 6,199,942 B1 | 3/2001 | Carroll, III et al. | |
| 6,221,292 B1 | 4/2001 | Carroll, III | |
| 6,247,745 B1 | 6/2001 | Carroll, III et al. | |
| 6,315,339 B1 | 11/2001 | Devilliers et al. | |
| 6,318,755 B1 | 11/2001 | Musser et al. | |
| 6,443,513 B1 | 9/2002 | Glance | |
| 6,547,280 B1 | 4/2003 | Ashmead | |
| 6,679,544 B1 | 1/2004 | Hubbert et al. | |
| 6,679,967 B1 | 1/2004 | Carroll, III et al. | |
| 6,682,128 B2 | 1/2004 | Carroll, III et al. | |
| 6,715,592 B2 | 4/2004 | Suzuki et al. | |
| 6,752,450 B2 | 6/2004 | Carroll, III et al. | |
| 6,763,322 B2 | 7/2004 | Potyrailo et al. | |
| 6,777,062 B2 | 8/2004 | Skaja | |
| 7,033,666 B2 | 4/2006 | Skaja | |
| 7,143,876 B2 | 12/2006 | Tamada et al. | |
| 7,163,244 B2 | 1/2007 | Meltzer | |
| 7,360,822 B2 | 4/2008 | Carroll, III et al. | |
| 7,377,577 B2 | 5/2008 | Carroll, III et al. | |
| 7,384,095 B2 | 6/2008 | Cormier et al. | |
| 7,404,593 B2 | 7/2008 | Cormier et al. | |
| 7,416,775 B2 | 8/2008 | Snel | |
| 7,574,760 B2 | 8/2009 | Foley et al. | |
| 7,625,023 B2 | 12/2009 | Audi et al. | |
| 8,465,087 B2 | 6/2013 | Gerwolls et al. | |
| 8,528,280 B2 | 9/2013 | Coil et al. | |
| 8,998,298 B2 | 4/2015 | Gerwolls et al. | |
| 9,194,136 B2 | 11/2015 | Cormier et al. | |
| 9,249,853 B2 | 2/2016 | Cormier et al. | |
| 9,279,258 B2 | 3/2016 | Cormier et al. | |
| 9,394,702 B2 | 7/2016 | Cormier et al. | |
| 9,420,843 B2 | 8/2016 | Cormier et al. | |
| 9,462,843 B2 | 10/2016 | Cormier et al. | |
| 9,528,280 B2 | 12/2016 | Cormier et al. | |
| 9,622,534 B2 | 4/2017 | Cormier et al. | |
| 9,644,699 B2 | 5/2017 | Cormier et al. | |
| 2002/0070584 A1 * | 6/2002 | Carroll, III | ................ B32B 3/28 |
| | | | 296/187.03 |
| 2009/0233045 A1 | 9/2009 | Slama et al. | |
| 2016/0177562 A1 | 6/2016 | Cormier et al. | |
| 2017/0011730 A1 * | 1/2017 | Seto | ........................ F16F 15/02 |
| 2017/0101789 A1 | 4/2017 | Cormier et al. | |
| 2018/0111518 A1 * | 4/2018 | Cormier | ............... B60N 2/4242 |

* cited by examiner

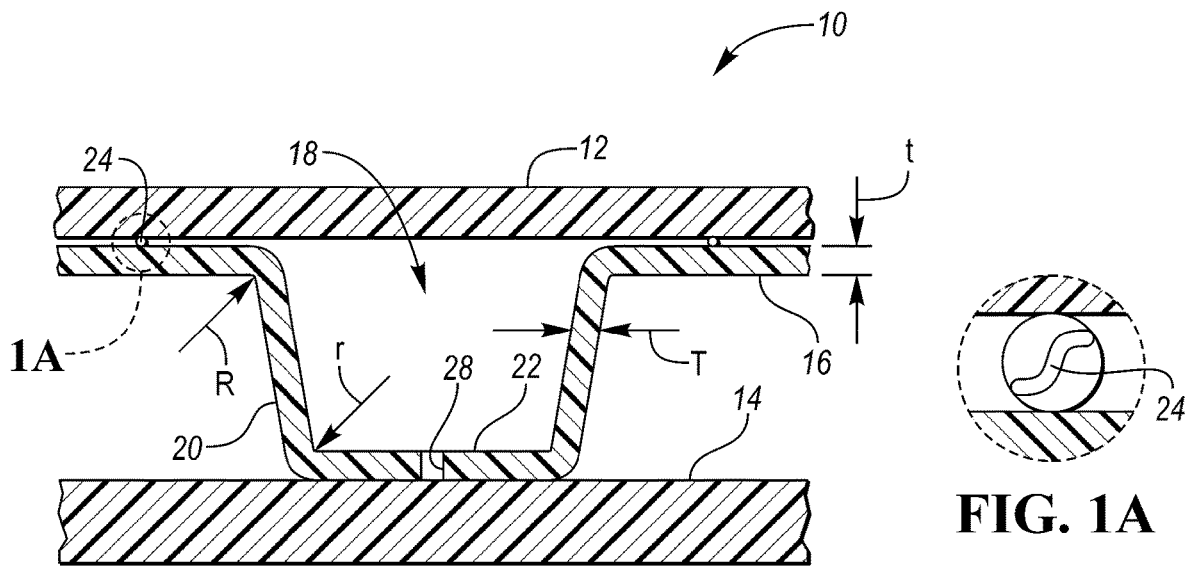
FIG. 1
FIG. 1A
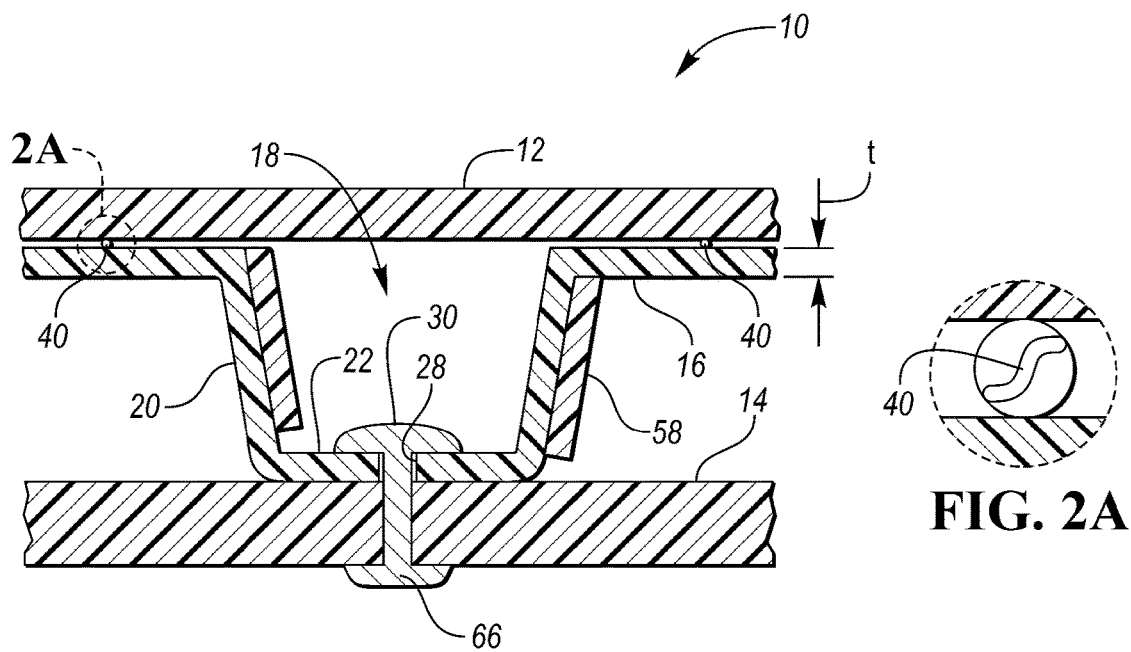
FIG. 2
FIG. 2A

MASS-OPTIMIZED FORCE ATTENUATION SYSTEM AND METHOD

BACKGROUND OF THE INVENTION

(1) Field of the Invention

One aspect of this disclosure relates to a force attenuation system that is interposed between an exterior surface and an interior surface, either or both of which may be subjected to percussive forces and a method for its manufacture

(2) Description of Related Art

Conventional thermoformed energy absorbers, such as those described in U.S. Pat. No. 6,247,745 are traditionally attached for example to an interior surface such as a vehicle headliner that may be exposed to forces generated by the head of a vehicle occupant in a crash situation. Such energy absorbers may be generally frusto-conical in shape. Their relative positions may be secured by a basal structure that lies adjacent to the headliner. Tops of the cones typically underlie the exterior vehicle skin.

Historically, such absorbers have been easy to attach through the use of hot melt adhesive systems with adequate energy absorbing capabilities. The periphery of the basal structure provides an ample surface area by which to attach the energy absorber to the interior surface or such as mating component, such as a headliner.

However, during the manufacture of such energy absorbers via in-line thermoforming, parts are formed in one machine operation and trimmed in another operation. This makes positive registration of the trim relative to the form difficult to control with a high degree of accuracy. The variation of the trim periphery profile relative to the formed features can be plus or minus several millimeters. To provide an ample and consistent surface area for robotically applied hot melt adhesive systems, a nominal dimension from the base of the energy absorbing units to the trimmed flange must be maintained such that a minimal amount of land is always available for adhesion to the mating component. This can require a nominal trim dimension 10-20 mm from the base of the cones.

While this additional flange may seem relatively small, automakers are constantly working to reduce vehicle mass. Thus, it is desirable to find a way to make the size of the flange and variation in the flange profile as small as possible.

BRIEF SUMMARY OF THE INVENTION

Several aspects of this disclosure relate to a force-attenuating system that is interposed between an exterior surface and an interior surface, either or both of which may be subjected to percussive forces. Such surfaces may be found in the automotive and non-automotive environments.

In brief, one embodiment includes:
i. a ceiling that is positioned proximate the exterior surface;
ii. one or more inverted hat-shaped force-attenuating units with sidewalls extending inwardly convergingly away from the ceiling, at least some of the units having a floor;
iii. a number (U) of upper sound-deadening structures positioned between the ceiling of at least one force-attenuating unit and the exterior surface, where $0<=U<1000$;
iv. a number (L) of lower sound-deadening structures positioned between the floor of at least one force-attenuating unit and the interior surface, where $0<=L<1000$;
v. a number (A) of apertures defined in the floor of at least one force-attenuating unit, where $0<=A<100$; and
vi. lower means for adhering at least one force-attenuating unit to the interior surface, the means for adhering optionally extending at least partially through at least some of the apertures.

BRIEF DESCRIPTION OF THE SEVERAL VIEWS OF THE DRAWINGS

FIG. 1 is a cross sectional view of a hat-shaped force-attenuation system that is interposed between exterior and interior surfaces, with a brim portion of the hat lying adjacent to the exterior surface;

FIG. 2 is a cross sectional view of an alternate embodiment of a force-attenuation system that has reinforcing ribs;

DETAILED DESCRIPTION OF THE INVENTION

Figure 3:
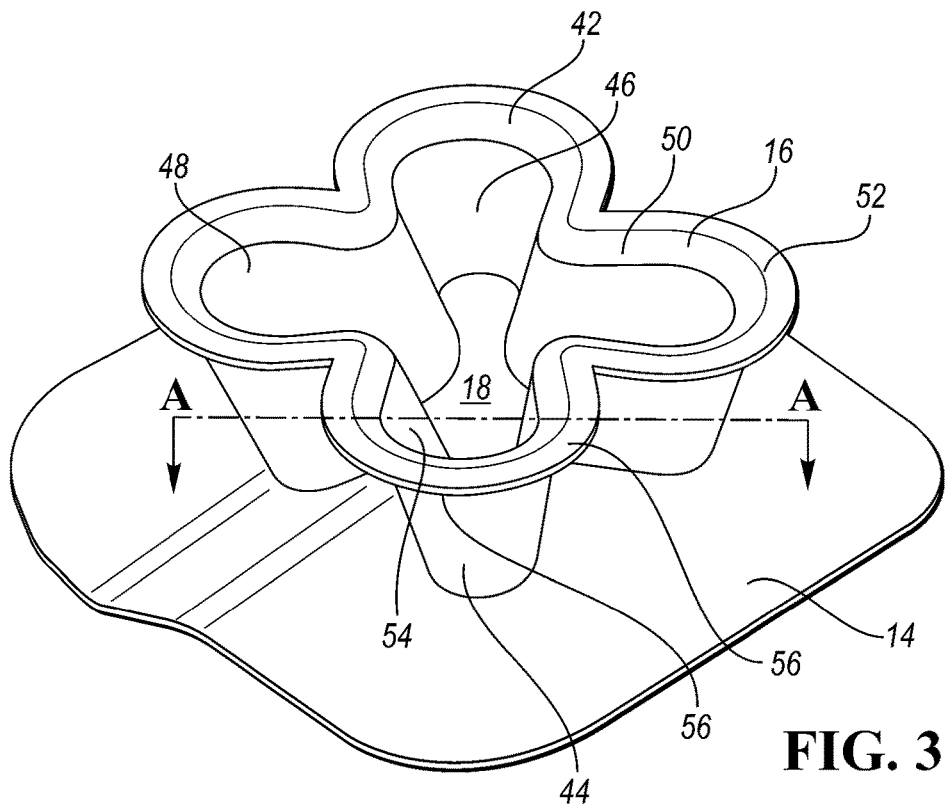
FIG. 3 is a perspective view of a force-attenuation system that is positioned atop an interior surface, with an exterior surface removed.

Referring first to FIGS. 1-3, several aspects of this disclosure relate to a force-attenuating system 10 that is interposed between an exterior surface 12 and an interior surface 14, either or both of which being subjected to percussive forces. In one embodiment, the system 10 has:
a. a ceiling 16 that is positioned proximate the exterior surface 12;
b. one or more inverted hat-shaped force-attenuating units 18 with sidewalls 20 extending inwardly convergingly away from the ceiling 16, at least some of the force-attenuating units 18 having a floor 22;
c. a number (U) of upper sound-deadening structures 24 positioned between the ceiling 16 of at least one force-attenuating unit 18 and the exterior surface 12, where $0<=U<1000$;
d. a number (L) of lower sound-deadening structures 26 positioned between the floor 22 of at least one force-attenuating unit 18 and the interior surface, where $0<=L<1000$;
e. a number (A) of apertures 28 defined in the floor 22 of at least one force-attenuating unit 18, where $0<=A<100$; and
f. lower means for adhering 30 at least one force-attenuating unit 18 to the interior surface 14, the means for adhering 30 optionally extending at least partially through at least some of the apertures 28.

In some cases, the exterior surface 12 is a vehicular exterior surface. In some cases, the interior surface 14 is a vehicular interior surface. In some cases, the interior vehicular surface 14 is selected from the group consisting of a headliner, a knee bolster, an interior vehicular panel, a side panel, a bumper, a hood, a fender, a vehicle pillar and a cargo load floor.

In other cases, the exterior surface may include without limitation a non-automotive surface. Such surfaces include a sports-playing surface (e.g., a floor, ceiling or wall of a hockey rink or basketball court or squash or other racquet sports court), including a walking/running track, a golf playing surface (e.g., a putting green or a driving range), a turf underlayment for a soccer, rugby, lacrosse, or football field, a stairway, a senior living or elder care facility (in which it would be desirable to prevent injury or reduce the adverse medical consequences of a fall), a hospital or out-patient facility, military blast mats, seats in military vehicles that may detonate a land mine, a helmet lining system, and a marine environment, including boating decks and docks. Each of these exemplary applications should be construed in a non-limiting manner.

Figure 6:
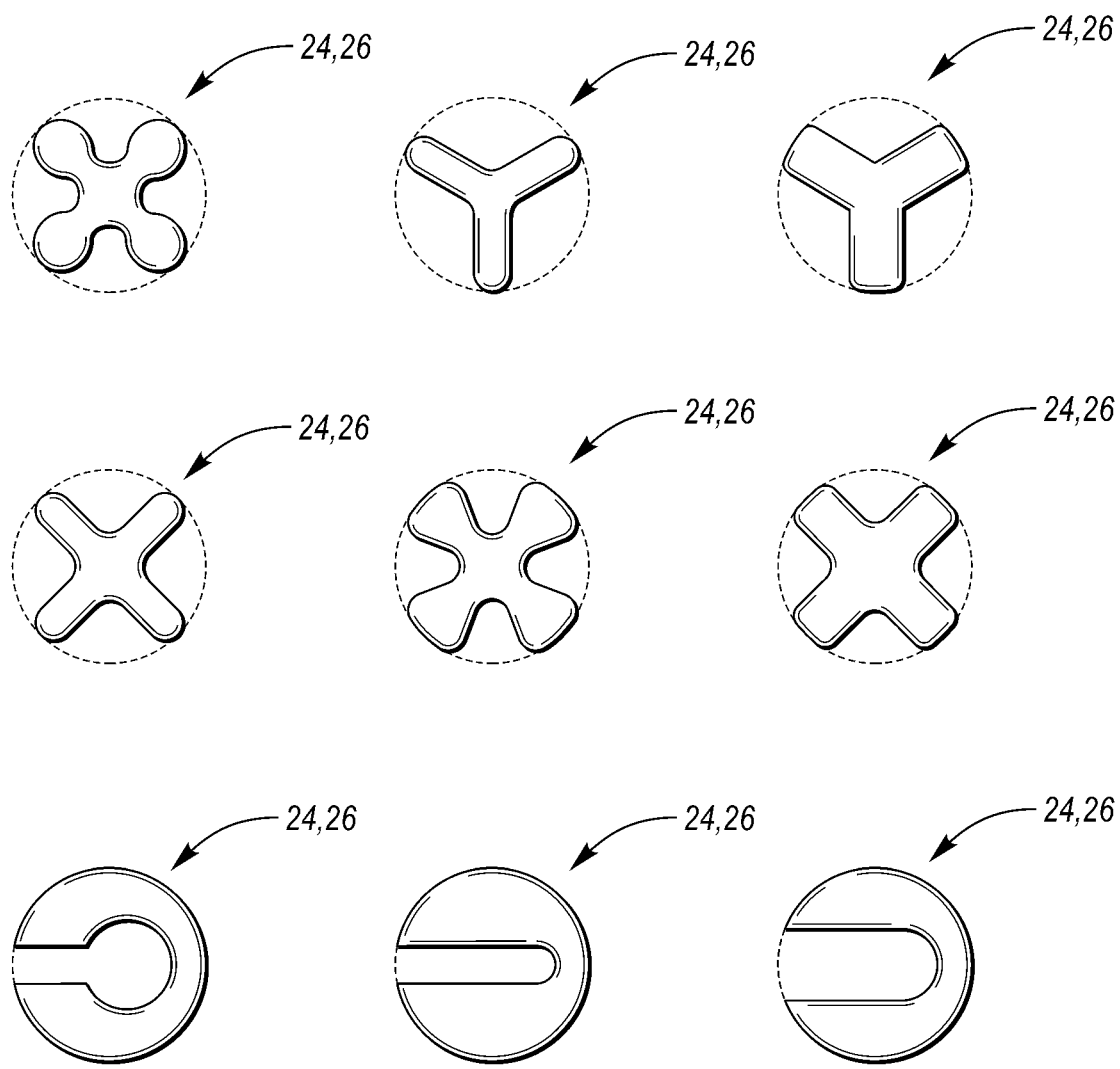
FIG. 6 depicts alternate embodiments of sound-deadening structures.

As illustrated in FIG. 6, at least some of the lower or upper sound-deadening structures 24, 26 have a configuration that is selected from the group consisting of a Y-shaped channel, a cross channel, modified crosses, fingers, clovers, spoons, and combinations thereof.

Figure 5:
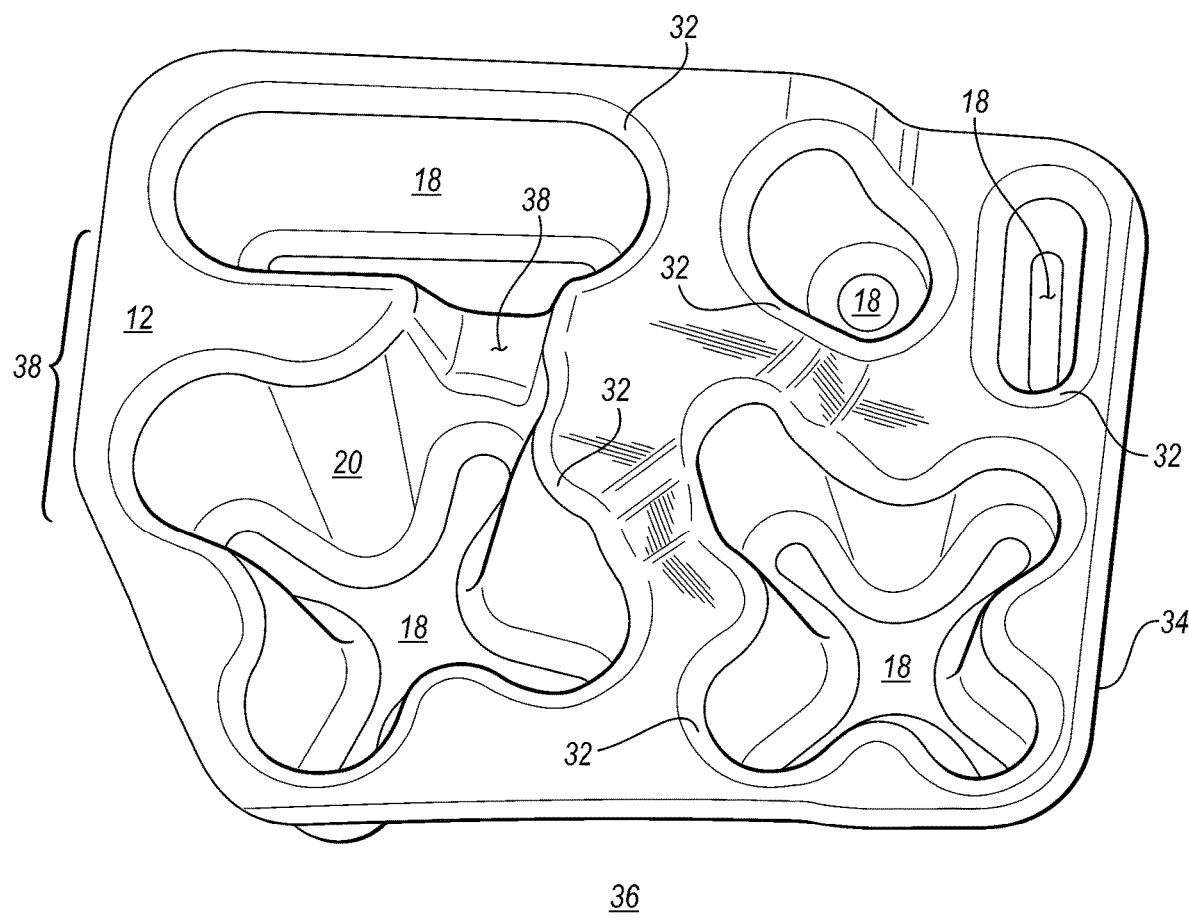
FIG. 5 is a representative quartering perspective view from below of a cluster of force-attenuation units within a boundary.

With primary reference to FIG. 5, at least some of the hat-shaped force-attenuating units 18 have a configuration defined in part by an imaginary footprint 32 adjacent to the exterior surface 12 or interior surface 14. That footprint 32 is from the group consisting of a circle, an oval, an ellipse, a clover leaf, a race-track, and footprints having other curved perimeters. For a given force-attenuating unit 18, the footprint at the exterior surface 12 may or may not be a geometrical equivalent to or the same size as the footprint at the interior surface 14. As a non-limiting example, one may be oval and the other be circular.

It will be appreciated that a boundary 34 may be considered to delimit a cluster of associated footprints 32. Within the boundary 34 lies one hat-shaped force attenuation unit 18 or a cluster 36 of hat-shaped force-attenuation units 18. Each hat-shaped force-attenuation unit 18 has a force-attenuation characteristic such that within the boundary 34, there is a set of user-determinable force attenuation properties that may be uniform or varied within the boundary 34.

Optionally, some force-attenuating units 18 in a cluster 36 are joined together (like Siamese twins) to form sub-assemblies 38 (FIG. 5) and some are isolated from each other. In another variant, force-attenuating units 18 in a cluster 36 have sidewalls 20 that are linked by a channel 38.

In some applications, the interior surface 14 is separated from the exterior surface 12 by multiple clusters 36 of hat-shaped force-attenuation units 18. By deploying such structures, an engineer or designer may tailor or tune or localize the force-attenuation characteristic to the needs of the application.

It will be appreciated that one manufacturing alternative (see, FIG. 1) contemplates that the ceiling 16 is thermo-formed with an average thickness (t) and the sidewall 20 is thermoformed with an average thickness (T). Unusually in the art of thermoforming, thinning occurs, such that (T)<(t). It may be desirable in a force-attenuation environment to have a thicker sidewall 20 such that (T)>(t). One way to do this is by compression molding. In that process, material from a semi-molten sheet is re-distributed from the floor 22 and/or the ceiling 16 towards the sidewall 20. One result is that sidewall thinning that conventionally results from a thermoforming operation is fortified by re-distributed or coined material from adjacent material.

Some applications call for an upper means 40 (FIG. 2) for adhering the ceiling 16 of at least one force-attenuation unit 18 to the exterior surface 12.

Neither the ceiling 16 nor the floor 22 of a force-attenuation unit 18 need be planar. But often, the floor 22 has a topography that matches that of the associated mating interior surface 14.

In some embodiments, such as those exemplified in FIGS. 3 & 5, one or more force-attenuating units 18 have a clover-leaf footprint 42. Those units have sidewalls 20 extending inwardly, convergingly away from the ceiling 16 and the exterior surface 12 to form clover leaf force-attenuating units 44. Each of those units 44 has a central region 46. One or more clover-like leaves 48 extend radially from the central region 46. At least some leaves 48 are hemi-pear shaped and have an interior lobe 50 proximate the central region 46. A larger exterior lobe 52 extends radially away from the interior lobe 50. The hemi-pear-shaped leaves 48 are provided with an open top 54 that is positioned towards the exterior surface 12 and a closed basin portion 56 that is positioned towards the interior surface 14.

A perimetral flange 56 is defined by the ceiling 16. The flange 56 extends outwardly from the central region 46 around the interior 50 and exterior lobes 52. As in other non-clover leaf configurations there may be
   a. a number (U) of upper sound-deadening structures 24 positioned between the perimetral flange and the exterior surface, where 0<=U<1000;
   b. a number (L) of lower sound-deadening structures 26 positioned between the closed basin portion of at least one hemi-pear-shaped leaf of a force-attenuation unit and the interior surface, where 0<=L<1000;
   c. a number (A) of apertures 28 defined in the closed basin portion of at least one hemi-pear-shaped leaf of a force-attenuation unit, where 0<=A<100; and
   d. lower means for adhering 30 at least one closed basin portion of at least one hemi pear-shaped leaf of a force-attenuation unit to the interior surface.

Optionally, an upper means 40 may be provided for adhering the perimetral flange of at least one clover-leaf force-attenuation unit to the exterior vehicular surface.

In some design variants, some force-attenuation units 18 are joined together to form sub-assemblies and some are isolated from each other.

In other design variants, there may be a cluster of hat-shaped force-attenuation units including clover-leaf units and non-clover leaf units.

Optionally (see, FIG. 2) one or more ribs 56 may extend at least partially outwardly 58 from a sidewall. In some cases, the ribs 56 extend at least partially inwardly from the sidewall 20. In some cases, the rib or ribs in a unit extend from the ceiling away from the exterior surface 12. In some cases, the rib or ribs in a unit extend from the floor 22 away from the interior surface 14. Sometimes, the interior ribs 56 may overlap. Sometimes the exterior ribs 58 may overlap.

One method for making the disclosed force-attenuating units involves the steps of:
   a. providing a semi-molten sheet from which ceiling, sidewall and floor portions are to be made;
   b. providing a two-sided tooling set, one side having a solid core with a defined contour including one surface of the force-attenuating units, the second side having a material entrapment ring which at least partially surrounds a coining cavity;
   c. moving the two sides of the tooling set towards one another with the sheet of semi-molten material in between;
   d. stretching and thinning the sidewall portion as the two sides move closer together;

e. bringing the entrapment ring into contact with the sheet to at least partially entrap some or all of the semi-material inside the ring and establishing a reservoir f. applying pressure across the core and cavity of the two-sided tool set;

g. forcing entrapped material from the floor and the ceiling into the sidewall to form a heated unit;

h. cooling the heated unit to form a cooled unit;

i. opening the two-sided tool set in opposite directions;

j. optionally trimming the cooled unit;

k. optionally performing one or more optional secondary operations.

Other methods for making the inverted hat-shaped force-attenuating units 18 include variants of thermoforming, compression molding, vacuum forming and injection molding.

It will be appreciated that the preferred manufacturing method is thermoforming since this produces a wall profile that yields a relatively idealized square wave response to an applied force. To minimize the thinning which occurs in the sidewalls, larger radii (R, r in FIG. 1) are employed to avoid extreme thinning which can occur when material is stretched in a thermoforming operation.

To recap, it would be desirable to attach a force-attenuator to a mating member such as an interior vehicle component like a headliner in a way that overcomes some difficulties that accompany conventional approaches. One aspect of this disclosure thus contemplates attachment to an interior mating component through the floor of the hat-shaped units of a force-attenuation structure. This is because the form tolerance is held much tighter than the highly variable periphery trim flange. Inversion of conventional lobed structures allows for a reduction in periphery flange size since it no longer serves an adhesive purpose.

It would be preferable if the inverted system had sufficient surface area at the floors of the units to keep them secured to for instance the headliner. In this orientation, the primary purpose of the ceiling that lies adjacent to for instance the exterior vehicle skin is primarily to distribute forces associated with a percussive blow (e.g. from a guard rail or other highway barrier in a crash situation) to an underlying interior reaction surface (e.g. a roof panel, roof, bow, door metal, or column).

Furthermore, it is believed that displacing the flange from the mating component (e.g., a headliner) creates an I-beam like structure that creates a more rigid assembly and thereby provides additional energy absorbing capability in a smaller footprint than if the force attenuator were engineered and attached conventionally. The disclosed structures distribute the load over a larger surface area than conventional energy absorbers.

This orientation and additional surface area is particularly advantageous when reacting against relatively compliant structures like vehicle roof metal which is susceptible to point deformation. Several embodiments create not only a stiffer structure but one with a reduced footprint with less mass.

To further reduce the mass of a thermoformed force-attenuator, it would be desirable to reduce the trim tolerance and the size of the nominal flange by forming and trimming the energy absorber at the same time. This would allow for further reduction in flange size by eliminating the inaccuracies that result from forming and then trimming in separate operations. Additionally, part marking information can be formed or coined into the top of the energy absorbing units instead of the base for further mass reduction.

It may also be desirable to perforate the flange or top of the force-attenuation units not only as a means of reducing mass, but to additionally create a mechanical bond 66 (FIG. 2) within the unit in the form of a means for adhering such as a glue rivet that is created when the adhesive is wetted out during assembly. While this complicates the tooling and manufacturing process, the cost and mass benefit over the life of a program far outweighs the increase in tooling complexity.

Figure 4:
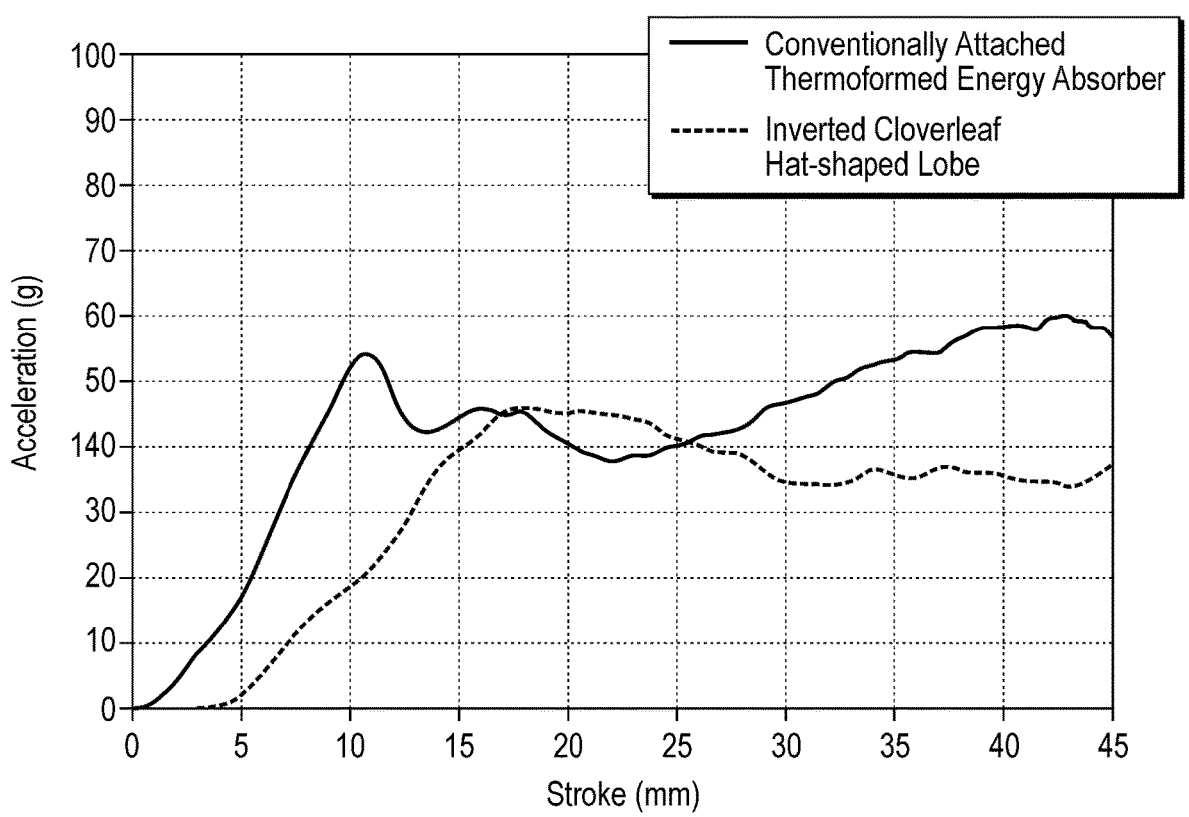
FIG. 4 is a family of stroke—acceleration curves.

Studies have shown that the mass of the attenuator can be reduced by as much as 30% compared to conventionally engineered thermoformed energy absorbers. Also, by providing a solid surface (e.g. the floor) at the point of impact, as opposed to impacting the hollow portion of an energy absorbing unit, the force-attenuation unit is engaged earlier as seen in the graph (FIG. 4). The dashed line represents the behavior of a conventional frusto-conical energy absorber, whereas the solid lines represent two gages of the same inverted four lobed clover leaf design. There is about a 3-4 mm delay in the initial ramp-up of the conventional design as opposed to the inverted design which ramps up almost immediately and occupies a smaller footprint.

The preferred manufacturing method is thermoforming since this produces a wall profile that yields a relatively idealized square wave response to an applied force. However, it is conceivable that the same design could be manufactured by other methods such as injection molding or compression molding.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A force-attenuating system that is interposed between an exterior surface and an interior surface which may be subjected to percussive forces, the system comprising:

a. a ceiling that is positioned proximate the exterior surface;

b. one or more inverted hat-shaped force-attenuating units with sidewalls extending inwardly convergingly away from the ceiling, at least some of the units having a floor, at least some of the units having an internal void opening between the sidewalls, the floor and the exterior surface and an external void space between the ceiling and the interior surface, the internal void opening and the external void space allowing the sidewall to deflect in response to the percussive forces;

c. a number (U) of upper sound-deadening structures positioned between the ceiling of at least one force-attenuating unit and the exterior surface, where $0<=U<1000$;

d. a number (L) of lower sound-deadening structures positioned between the floor of at least one force-attenuating unit and the interior surface, where $0<=L<1000$;

e. a number (A) of apertures defined in the floor of at least one force-attenuating unit, where $0<=A<100$; and f. lower means for adhering the floor of at least one force-attenuating unit to the interior surface, the means for adhering optionally extending at least partially through at least some of the apertures.

2. The force-attenuating system of claim 1, wherein the exterior surface includes a vehicular exterior surface.

3. The force-attenuating system of claim 1, wherein the interior surface includes a vehicular interior surface.

4. The force-attenuating system of claim 3, wherein the interior vehicular surface is selected from the group consisting of a headliner, a knee bolster, an interior vehicular panel, a side panel, a cargo load floor and a vehicle pillar.

5. The force-attenuating system of claim 1, wherein at least some of the sound-deadening structures have a configuration that is selected from the group consisting of a Y-shaped channel, a cross channel, modified crosses, fingers, clovers, spoons, and combinations thereof.

6. The force-attenuating system of claim 1, wherein at least some of the hat-shaped force-attenuating units have a configuration defined in part by an imaginary footprint adjacent to the exterior surface, the footprint being selected from the group consisting of a circle, an oval, an ellipse, a clover leaf, a race-track, and other curved perimeters.

7. The force-attenuating system of claim 1, wherein at least some of the hat-shaped force-attenuating units have a configuration defined by an imaginary footprint adjacent to the interior surface, the footprint being selected from the group consisting of a circle, an oval, an ellipse, a clover leaf, a race-track, and other curved perimeters.

8. The force-attenuating system of claim 1, wherein a boundary delimits the ceiling that surrounds the hat-shaped force-attenuation units.

9. The force-attenuating system of claim 8, wherein a cluster of hat-shaped force-attenuation units lie within the boundary, at least some of the hat-shaped force-attenuation units having a force-attenuation characteristic such that within the boundary, there is a user-determinable force attenuation property that may be uniform or varied within the boundary.

10. The force-attenuating system of claim 9, wherein some force-attenuating units in a cluster are joined together to form sub-assemblies.

11. The force-attenuating system of claim 10, wherein the force-attenuating units in a cluster have sidewalls that are linked by a channel.

12. The force-attenuating system of claim 10, wherein the interior surface is separated from the exterior surface by multiple clusters of hat-shaped force-attenuation units.

13. The force-attenuating system of claim 1, wherein:
  a. the ceiling is thermoformed and has an average thickness (t),
  b. the sidewall is thermoformed and has an average thickness (T); and
  c. (T)>(t).

14. The force-attenuating system of claim 1, wherein the floor has a topography that matches the interior surface.

15. The force-attenuating system of claim 1, wherein the ceiling has a topography that matches the exterior surface.

16. A cluster of force-attenuation units selected from the group consisting of the force-attenuation units of claim 1 and clover leaf force-attenuation units.

17. The force-attenuating system of claim 1 further comprising one or more ribs extending at least partially outwardly from a sidewall.

18. The force-attenuating system of claim 1, further comprising one or more ribs that extend at least partially inwardly from the sidewall.

19. The force-attenuating system of claim 17, wherein the one or more ribs extend at least partially from the ceiling.

20. The force-attenuating system of claim 17, wherein the one or more ribs extend at least partially from the floor.

21. The force-attenuating system of claim 18, wherein the one or more ribs extend at least partially from the ceiling.

22. The force-attenuating system of claim 18, wherein the one or more ribs extend at least partially from the floor.

23. The force-attenuating system of claim 1, wherein the exterior surface includes a non-vehicular exterior surface selected from the group consisting of a sports-playing surface; a walking/running track; a golf playing surface; a turf underlayment for a soccer, rugby, lacrosse, or football field; a stairway; an architectural feature of a senior living or elder care facility or hospital or out-patient facility; a military blast mat; a seat in a military vehicle that may detonate a land mine; a helmet lining system; and a marine environment, including boating decks and docks.

24. A method for making the inverted hat-shaped force-attenuating units of claim 1, comprising the steps of:
  a. providing a semi-molten sheet from which ceiling, sidewall and floor portions of the inverted hat-shaped force-attenuating units are to be prepared;
  b. providing a two-sided tooling set, one side having a solid core with a contour that defines one surface of the force-attenuating units, the second side having a material entrapment ring which at least partially surrounds a coining cavity;
  c. moving the two sides of the tooling set towards one another with the sheet of semi-molten material in between the two sides;
  d. stretching and thinning the sidewall portion as the two sides move closer together;
  e. bringing the entrapment ring into contact with the sheet to at least partially entrap some or all the semi-molten material inside the ring and establishing a reservoir;
  f. applying pressure across the core and cavity of the two-sided tool set;
  g. forcing entrapped material from the floor and the ceiling into the sidewall to form a heated unit;
  h. cooling the heated unit to form a cooled unit;
  i. optionally trimming the cooled unit; and
  j. optionally performing one or more optional secondary operations.

25. A method for making the inverted hat-shaped force-attenuating units of claim 1, the method being selected from the group consisting of thermoforming, compression molding, vacuum forming and injection molding.

26. A force-attenuating system that is interposed between an exterior surface and an interior surface, the force-attenuating system comprising:
  a. a ceiling that is positioned proximate the exterior surface;
  b. one or more force-attenuating units, at least some of the force-attenuating units having an internal void opening between sidewalls, a floor and the exterior surface and an external void space between the ceiling and the interior surface, the internal void opening and the external void space allowing sidewalls to deflect in response to the percussive forces, at least some of the force-attenuating units having a cloverleaf footprint extending inwardly, convergingly away from the ceiling and the exterior surface to form cloverleaf force-attenuating units, at least some of the cloverleaf force-attenuating units having:
    i. a central region positioned proximate the interior surface;
    ii. one or more clover-like leaves extending radially from the central region, wherein at least some leaves are hemi-pear shaped with sidewalls, the hemi-pear shaped leaves having an interior lobe proximate the central region and a larger exterior lobe extending radially away from the interior lobe, the hemi pear-shaped leaves having an open top that is positioned towards the exterior surface and a closed basin portion that is positioned proximate the interior surface; and iii. a perimetral flange defined by the ceiling, the flange extending outwardly from the around the sidewalls associated with the interior and exterior lobes;

c. a number (U) of upper sound-deadening structures positioned between the perimetral flange and the exterior surface, where 0<=U<1000;

d. a number (L) of lower sound-deadening structures positioned between the closed basin portion of at least one hemi-pear-shaped leaf of a force-attenuation unit and the interior surface, where 0<=L<1000; and e. a number (A) of apertures defined in the closed basin portion of at least one hemi-pear-shaped leaf of a force-attenuation unit, where 0<=A<100; and f. lower means for adhering at least one closed basin portion of at least one hemi-pear-shaped leaf of a force-attenuation unit to the interior surface.

27. The force-attenuation system of claim 26, wherein some force-attenuation units are joined together to form sub-assemblies.

28. A force-attenuating system that is interposed between an exterior surface and an interior surface, the interior surface being subjected to percussive forces, the system comprising:

a ceiling that is positioned proximate the exterior surface;

one or more inverted hat-shaped force-attenuating units with sidewalls extending inwardly convergingly away from the ceiling, at least some of the units having a floor, at least some of the units having an internal void opening between the sidewalls, the floor and the exterior surface and an external void space between the ceiling and the interior surface, the internal void opening and the external void space allowing the sidewall to deflect in response to the percussive forces, wherein the sidewalls are stretched and thinned during thermoforming; and semi-molten material is coined during thermoforming so that material is moved from the floor and the ceiling into a sidewall.

29. A force-attenuating system that is interposed between an exterior surface and an interior surface, the interior surface being subjected to percussive forces, the system comprising:

a ceiling that is positioned proximate the exterior surface and spaced apart by an empty space from the interior surface;

one or more inverted hat-shaped force-attenuating units with sidewalls extending inwardly convergingly away from the ceiling so that an external void space is created, outside the sidewalls between the ceiling and the interior surface, at least some of the units having a floor that is spaced apart from the exterior surface so that an internal void opening is created between the sidewalls and the floor below the exterior surface, the internal void opening and the external void space allowing the sidewall to deflect in response to the percussive forces, wherein the sidewalls are stretched and thinned during thermoforming; and semi-molten material is coined during thermoforming so that material is moved from the floor and the ceiling into a sidewall.

30. The force-attenuating system of claim 28, wherein an upper sound-deadening structure is formed by a thinned area lying between the ceiling and the exterior surface.

31. The force-attenuating system of claim 28, wherein a wall profile is presented, the wall profile having larger radii (R) between the ceiling and a sidewall and a smaller radii (r) between a sidewall and a floor to avoid extreme thinning which can occur when material is stretched in a thermoforming operation.

32. The force-attenuating system of claim 28, wherein the ceiling, the sidewalls and the floor include a thermoplastic.

* * * * *